United States Patent [19]
Morgan

[11] Patent Number: 5,298,270
[45] Date of Patent: Mar. 29, 1994

[54] BARBECUE COOKING, PROCESSING, PACKAGING AND STORAGE SYSTEM

[76] Inventor: Doug Morgan, 2201 Scenic Highway 0-7, Pensacola, Fla. 32503

[21] Appl. No.: 860,463

[22] Filed: Mar. 30, 1992

[51] Int. Cl.$^5$ .......................... A23L 1/31; A23L 1/315; B65B 55/00
[52] U.S. Cl. .................................. 426/234; 426/393; 426/410; 426/412; 426/523; 426/524; 426/615; 426/638; 426/641; 426/644
[58] Field of Search ............... 426/113, 129, 234, 393, 426/410, 412, 523, 524, 615, 638, 641, 644

[56] References Cited
U.S. PATENT DOCUMENTS

| | | | |
|---|---|---|---|
| 3,075,843 | 1/1963 | Maas et al. | 426/641 X |
| 3,132,029 | 5/1964 | Beck | 426/412 |
| 3,537,864 | 11/1970 | Magiera | 426/641 |
| 3,966,980 | 6/1976 | McGuckian | 426/393 |
| 4,940,590 | 7/1990 | Williams et al. | 426/641 X |
| 4,973,492 | 11/1990 | Gibson | 426/641 |

FOREIGN PATENT DOCUMENTS

| | | | |
|---|---|---|---|
| 498224 | 12/1953 | Canada | 426/412 |
| 2240253 | 7/1991 | United Kingdom | 426/410 |

OTHER PUBLICATIONS

Disclosure Document No. 279235, submitted Apr. 15, 1991.

*Primary Examiner*—Leo B. Tentoni
*Attorney, Agent, or Firm*—S. Pal Asija

[57] ABSTRACT

A novel system of barbecue cooking, processing, packaging, and storage of meats such as ribs, chicken etc is described. A byproduct of the cooking and blending is pasteurization in one and the same process. The consumer merely microwaves or boils the finished product intact with its OEM packaging and enjoys the taste as if the meat has just been prepared on a barbecue pit. A special barbecue sauce is marinated into the meat to create a realistic barbecue flavor. The process also increases the shelf life of the product as prepared by this process. A pH factor of 3.5 is maintained which not only kills the bacteria and germs but it also helps tenderize the meat and prevents from growing spores.

14 Claims, No Drawings

BARBECUE COOKING, PROCESSING, PACKAGING AND STORAGE SYSTEM

RELATED DOCUMENT

This patent application is based upon the concept disclosed and filed with the U, S, Patent office under the disclosure document program. The commissioner assigned the number 279,235 to the document entitled, 'Barbecue Cooking Processing Packaging and Storage System' and is dated Apr. 15, 1991. The applicant requests that the concept document number 279,235 be incorporated into this file.

BACKGROUND

A formal prior art search was not conducted but the inventor is keenly aware of the market. Many consumers love barbecued ribs and chicken etc but hate the hassle, inconvenience expense and time involved in going to a restaurant or barbecuing at home.

The barbecue cooking, processing, packaging and storage system of this invention permits the consumer to enjoy barbecue taste merely by boiling the package in water or heating it in a microwave oven or in a steam table. Prior art barbecue processes such as the processes used in Lloyds Food Products, Hillshire Farms, Kahns, Bryan Food Co, Webber Farms and Wilson Foods do not meet all of the following objective established by the inventor.

OBJECTIVES

1. The main objective of this invention is to permit the consumer barbecue benefits without the hassle, expense and time delay involved in conventional barbecue techniques.

2. Another objective of this invention is to increase the refrigerated shelf life (after thaw) of the products prepared with the process of this invention without using any preservatives or chemicals.

3. Another objective of this invention is to permit restaurants to increase their efficiency and profitability by having a 3.5 pH factor approximately, to extend shelf life and thus avoiding waste from spoilage.

4. Another objective of this invention is to make the product safer by eliminating all bacterial growth.

5. Another objective of this invention is to marinate the product with a special sauce to create a more realistic barbecue flavor.

6. Another objective of this invention is to package the barbecued food product such as meats and vegetables in such strong and transparent package that the consumer can readily microwave or boil or heat in a steam table the bag without any adverse affect on the food product and the concomitant barbecue taste.

7. Another objective of this invention is that it be readily adaptable for use by travellers and vacationers.

8. Another object of this invention is that it can be packaged as an MRE (Meal Ready to eat ) for use by armed forces.

9 Another objective of this invention is to combine cooking, blending of sauces and pasteurization into one and the same process.

10. Another objective of this invention is to result in automatic pasteurization as a by-product of the cooking and sauce blending.

11. Another objective of this invention is to create a unique taste.

12. Another objective of this invention is that it be equally applicable to all types of meats including but not limited to beef, pork, fish, chicken etc.

13. Another objective of this invention is that the process be applicable to all types of vegetables such as broccoli, cauliflower, carrots etc.

14. Another objective of this invention is to create a product by this process which is appealing to the eye as well as very tempting and tasty.

15. Another objective of this process is that it kill all bacteria and germs from the food product.

16. Another objective of this invention is that the process automatically tenderize the food product while marinating in the unique sauce having a pH factor from 3.4 to 3.6

17. Another objective of this invention is that the food product prepared by this process be suitable for home delivery, hospitals, convalescent homes, outside communal food stands, airplanes, boats, trains, camps etc.

18. Another objective of this process is to cook and heat the food product long enough to kill all bacteria, fungi and anything that would spoil the food product.

19. Other objects of this invention reside in its completeness as a system and a process, simplicity, ease of manufacture and ease of use and packaging as will become apparent from the following detailed description of the preferred embodiment.

SUMMARY

The unique flavor in this process is obtained by blending a special sauce having a pH factor of approximately 3.5 with natural juices from the food product such as the meats and vegetables by heating both sauce and the food product in the bag.

Any other type of cooking, cannot does not and will not create or result in this special flavor and taste. If the product is cooked separately and then this sauce is added the taste is not the same. If the product is barbecued in this sauce, the flavor is not the same. No other cooking process or recipe can duplicate this its flavor and taste.

In short its the process of cooking in the bag with the special sauce which while marinating, tenderizes the food product and pasteurizes it at the same time as a by-product of this process.

The cooking, sauce blending and marinating, meat tenderizing and even pasteurization take place in one and the same process. In fact pasteurization is a by-product of this cooking and blending process.

DETAILED DESCRIPTION OF THE PREFERRED EMBODIMENT

The following steps are used by the inventor in the barbecue cooking, processing, packaging and storage system of this invention.

1. The meat is received in the fresh or frozen condition. If frozen it is thawed to bring it back to fresh state. It is inspected for and conformed to proper quality.

2. The excess fat is trimmed of, brisket cut off and trimmed and sorted according to size and style.

3. The food product is then cooked in a 'first cook' for two hours in non-smoke 190 degrees 100% humid environment.

4. The food product is then cooked for a 'Second Cook' and smoke the meat for approximately 45 minutes in smokey 150 degrees dry bulb, 137 degrees wet bulb setting.

5. A special sauce having a pH factor between 3.4 to 3.7 is then applied and each serving is individually bagged in heavy transparent (such as Cryovac brand) bag and sealed hermetically.

The special sauce is dependent upon the type of the meat or vegetarian food. Typically ingredients in a barbecue ribs sauce include the following:
a) Tomato concentrate
b) Sugar
c) Water
d) Distilled vinegar
e) Salt
f) Spices
g) Natural smoke flavoring
h) High Fructose corn syrup
i) Dehydrated Onion
j) Sodium
k) Benzoate and
l) Citric acid.

The exact composition of the sauce depends upon many factors including but not limited to the following.
a) Type and condition of food or meat
b) Local tastes of the consumer market in which product is to be sold.
c) Cooking environmental conditions 6. The food product is then cooked for a 'Third Cook' in the bag at 190 degrees for two hours while checking for tenderness every 15 minutes.

The desired tenderness is reached within the third hour of cooking at 190 degrees Fahrenheit.

This 'Third Cook' which pasteurizes and homogenizes the meat kills all bacterial growth inside the bag and forms the basis of 60 to 90 days of shelf life after the product has been thawed by the consumer. The frozen shelf life in the marketing channels or the consumer is virtually unlimited.

7. The food product is then Cooled and marinated in refrigerator for ten to 14 days.

8. The food product is then frozen and shipped to the end user through the established marketing channels in this frozen state.

The product can stay in the frozen state in the marketing channels or at premises of the consumer indefinitely. After the product has been thawed it has a shelf life of 60 to 90 days depending upon the food product during which period the product must be heated and served.

NOTE: Chicken has a lower shelf life than ribs.

9. When the end user is ready to consume the food product is thawed.

10. The end user then heats the food product in microwave or in boiling water during the recommended shelf life.

11. The end user finally removes the food product from the bag and serves to the consumer while still warm.

While this system and process has been described generically it is not intended to be construed in a limiting sense. Various changes may be made to this process and system without deviating from the spirit of this invention. Examples of such contemplated changes are as follows.

1. The process may be applied to other meats and food products.
2. The permutation and/or combination of the steps may be varied.
3. The sauce may be changed to suit individual, regional or ethnic preferences.
4. The cooking environments may be somewhat varied in temperature, humidity, duration etc without deviating from the overall objectives established and enumerated by the inventor.
5. The product may be packaged differently or in a different kind of package.
6. The process and the product may be adopted for use in remote locations for example by military as an MRE (Meals Ready to Eat)
7. The process and the product may be adapted for use by travellers at home and abroad.
8. The process and the product may be adapted for use by restaurants,
9. The process and the product may be franchised or licensed.
10. The process and the product may be adapted for use in convenience stores.
11. The process and the product may be adapted for use in prisons.
12. The process and the product may be adapted for home delivery.
13. The process and the product may be adapted for use in hospitals and convalescent homes or elderly home care.
14. The process and the product may be adapted for outside communal food stands.
15. The process and the product may be adapted for use on airplanes, boats, trains, buses, recreational vehicles and the like.
16. The process and the product may be adapted for use in camping.

While this invention has been described with reference to illustrative embodiments, this description is not intended to be construed in a limiting sense. Various modifications and combinations of the illustrate embodiments as well as other embodiments of the invention will be apparent to person skilled in the art upon reference to this description. It is therefore contemplated that the appended claims cover any such modifications, embodiments as fall within the true scope of the invention.

The Inventor claims:

1. A triple cook barbecue meat cooking, processing, packaging and storage system comprising the steps of:
    a) trimming the fat and cutting off brisket from the meat to be barbecued;
    b) barbecue cooking said meat for a 'first cook' for approximately two hours in non-smoke 190 degrees 100% humid environment;
    c) barbecue cooking said meat for a 'Second Cook' and smoking said meat for approximately 45 minutes in smokey 150 degrees dry bulb, 137 degrees wet bulb setting;
    d) applying a special meat dependent sauce having a pH factor between 3.4 to 3.7 to said meat;
    e) individually bagging and hermetically sealing said meat in heavy transparent cryovac bag;
    f) barbecue cooking said meat for a 'Third Cook' in the bag at 190 degrees for two hours while checking for tenderness every 15 minutes;
    g) cooling and marinating said meat in refrigerator for ten to 14 days; and
    h) freezing and shipping said meat to the end user through the established marketing channels.

2. The triple cook barbecue meat cooking, processing, packaging, and storage system of claim 1 wherein said meat comprises ribs.

3. The triple cook barbecue meat cooking, processing, packaging and storage system of claim 1 wherein said meat comprises chicken.

4. The triple cook barbecue meat cooking, processing, packaging and storage system of claim 1 further incorporating the steps of:
   a) thawing said meat;
   b) heating said meat; and
   c) removing said meat from said bag.

5. The triple cook barbecue meat cooking, processing, packaging and storage system of claim 4 wherein said heating is performed in microwave.

6. The triple cook barbecue meat cooking, processing, packaging and storage system of claim 4 wherein said heating step is performed in boiling water.

7. A barbecue cooking, processing, packaging and storage system comprising the steps of:
   a) preparing the food for barbecuing;
   b) barbecuing said food product in three separate cooks viz a first cook, a second cook and a third cook;
   c) cooling and marinating said meat in refrigerator for ten to 14 days;
   d) freezing and shipping said food product to the end user through the established marketing channels in said frozen state;
   e) thawing said food;
   f) heating said food; and
   g) removing said food from said bag for consumption; and
   h) wherein further said first cook comprises cooking for approximately two hours in non-smoke 190 degrees 100% humid environment.

8. The barbecue cooking, processing, packaging and storage system of claim 7 wherein said second cook comprises cooking said food for approximately 45 minutes in smokey 150 degrees dry bulb, 137 wet bulb setting.

9. The barbecue cooking, processing, packaging and storage system of claim 7 wherein following additional steps are incorporated between said second cook and said third cook;
   a) applying a special food dependent sauce having a pH factor between 3.4 to 3.7 said food;
   b) individually bagging and hermetically sealing each serving in heavy transparent cryovac bag.

10. The barbecue cooking, processing, packaging and storage system of claim 7 wherein said third cook comprises cooking said food in the bag at 190 degrees for two hours.

11. A barbecue meat cooking, processing, packaging and storage system comprising the steps of:
   a) trimming the fat and cutting off brisket from the meat to be barbecued;
   b) barbecue cooking said meat in a first cook, followed by a second cook and followed by a third cook wherein further;
   c) said first cook comprises cooking said meat for approximately two hours in non-smoke 190 degrees 100% humid environment;
   d) said second cook comprises cooking and smoking said meat for approximately 45 minutes in smokey 150 degrees dry bulb, 137 degrees wet bulb setting;
   e) applying a special meat dependent sauce having a pH factor between 3.4 to 3.7 to said meat;
   f) individually bagging and hermitically sealing said meat in heavy transparent cryovac bag;
   g) said third cook comprises cooking said meat in the bag at 190 degrees for two hours while checking for tenderness every 15 minutes;
   h) cooling and marinating said meat in refrigerator for ten to 14 days; and
   i) freezing and shipping said meat to the end user through the established marketing channels;
   j) thawing said meat;
   k) heating said meat; and
   l) removing said meat from said bag for consumption.

12. The barbecue meat cooking, processing, packaging and storage system of claim 11 wherein said meat comprises ribs.

13. The barbecue meat cooking, processing, packaging and storage system of claim 11 wherein said meat comprises chicken.

14. The barbecue meat cooking, processing, packaging and storage system of claim 11 wherein said meat comprises a variety pack of plurality of meats.

* * * * *